Figure 1:
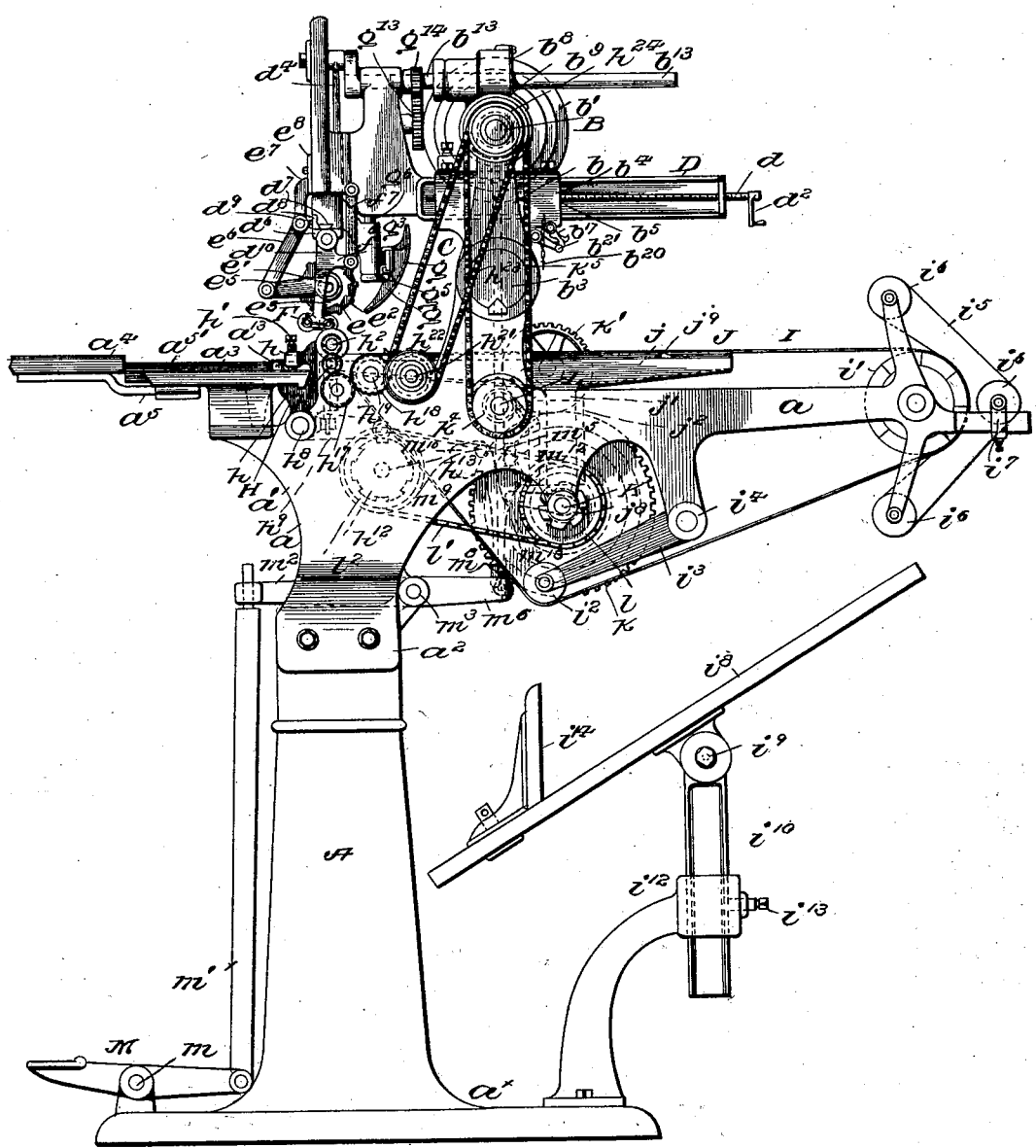

No. 694,408. Patented Mar. 4, 1902.
J. F. McNUTT.
NUMBERING MACHINE.
(Application filed May 25, 1898.)
(No Model.) 7 Sheets—Sheet 1.

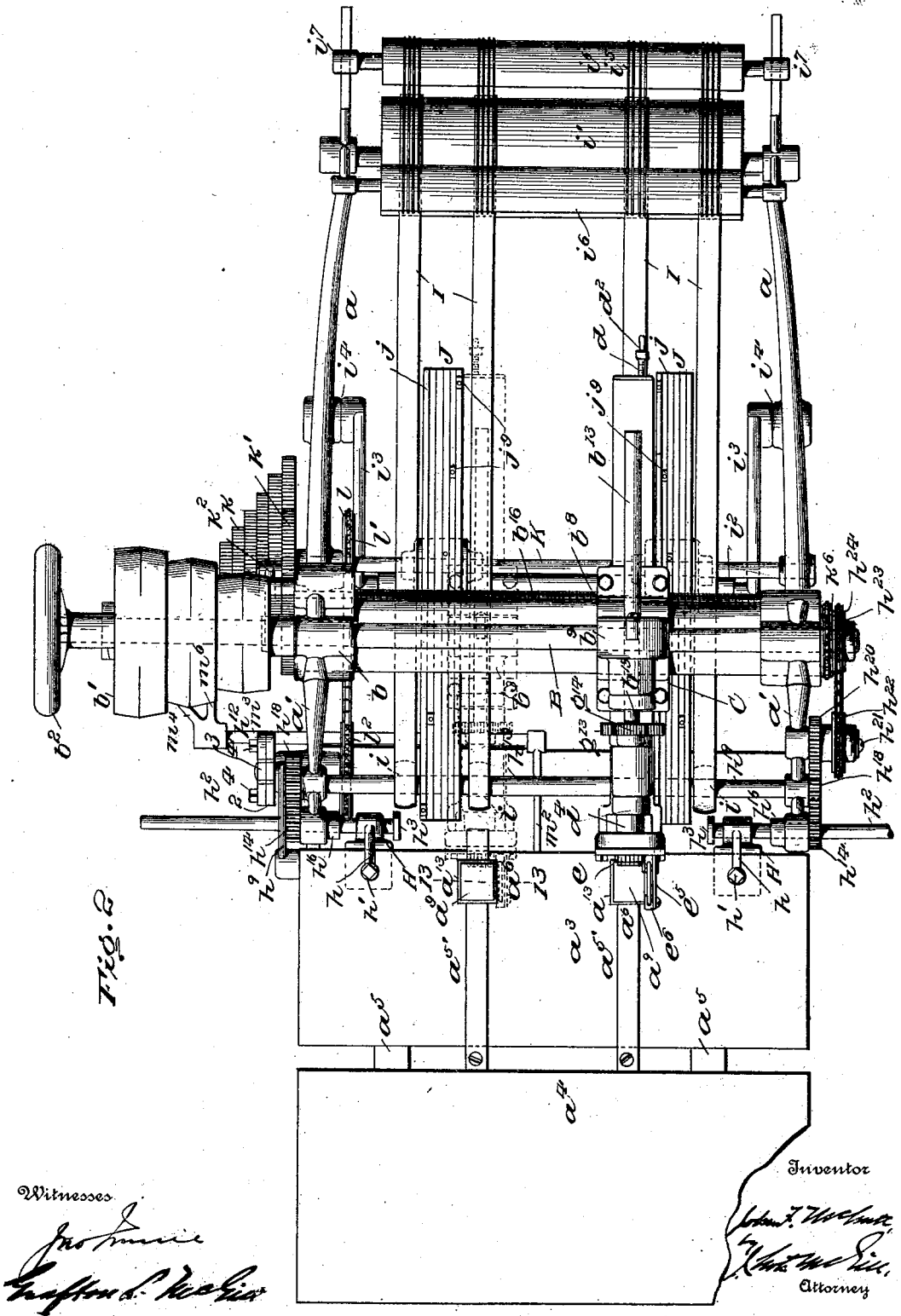

No. 694,408. Patented Mar. 4, 1902.
J. F. McNUTT.
NUMBERING MACHINE.
(Application filed May 25, 1898.)
(No Model.) 7 Sheets—Sheet 3.
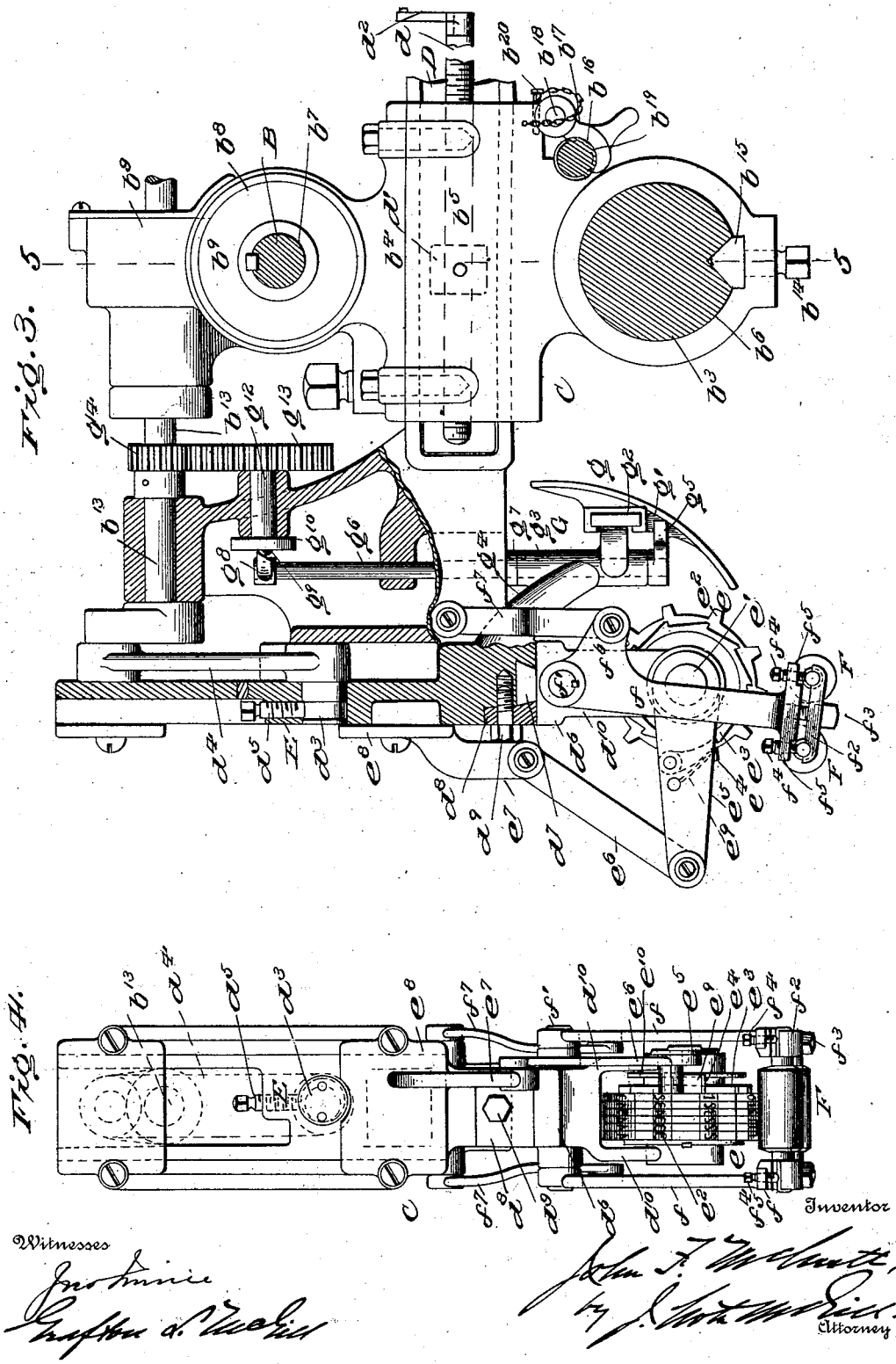

No. 694,408. Patented Mar. 4, 1902.
J. F. McNUTT.
NUMBERING MACHINE.
(Application filed May 25, 1898.)
(No Model.) 7 Sheets—Sheet 4.
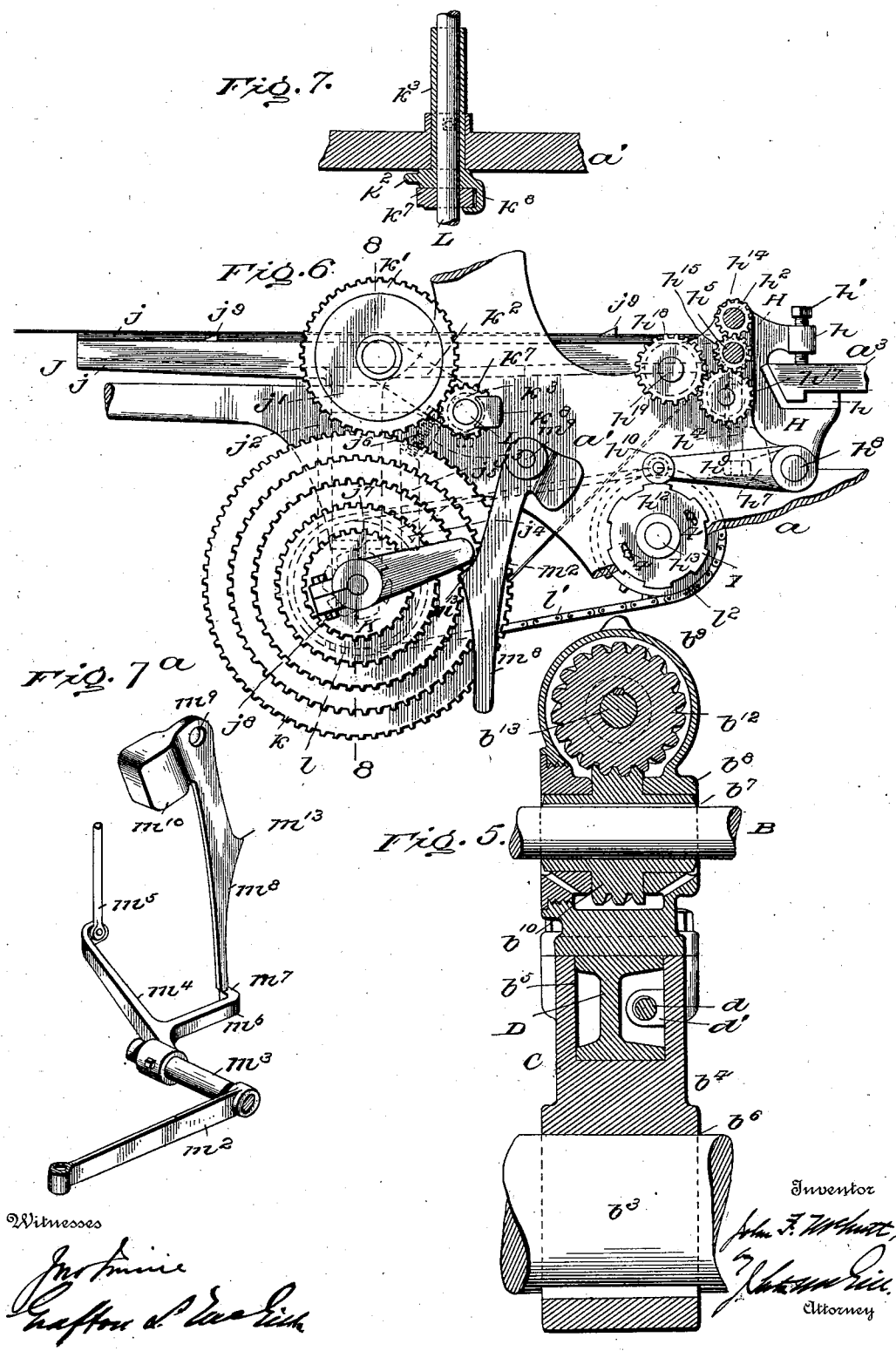

No. 694,408. Patented Mar. 4, 1902.
J. F. McNUTT.
NUMBERING MACHINE.
(Application filed May 25, 1898.)
(No Model.) 7 Sheets—Sheet 5.
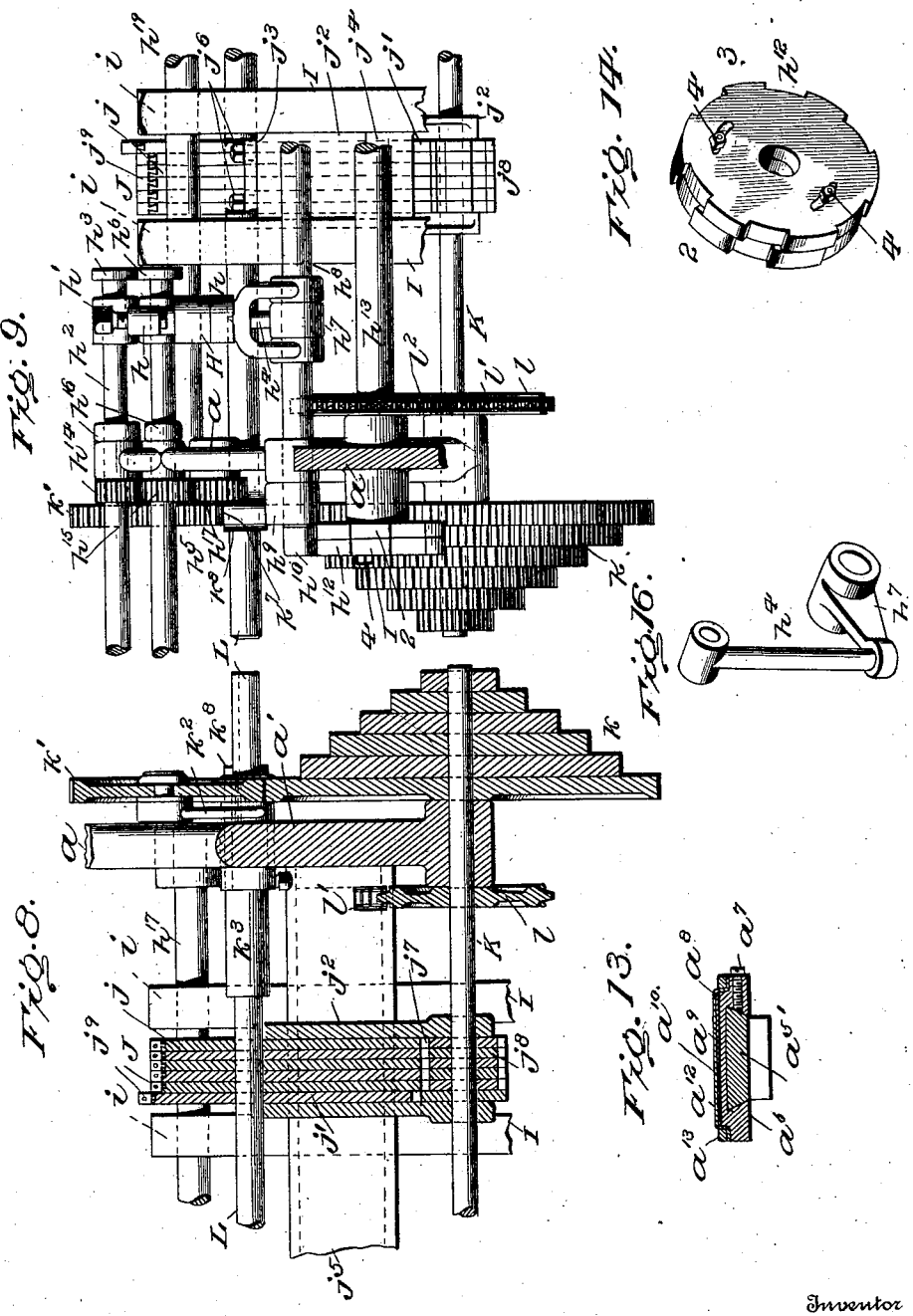

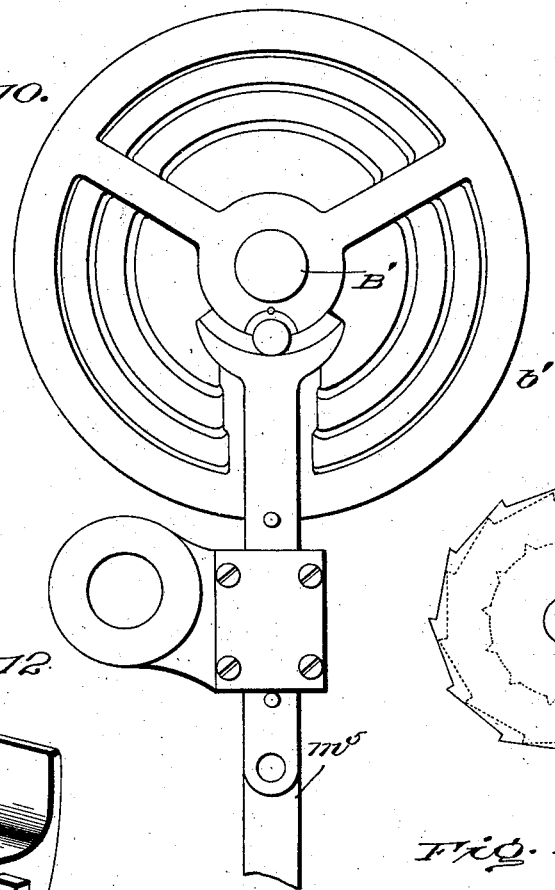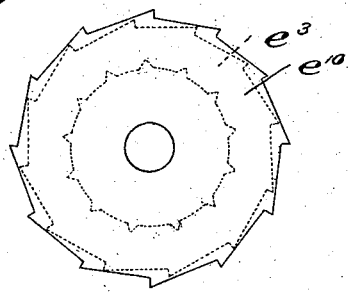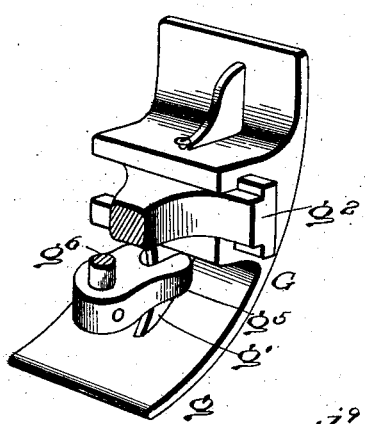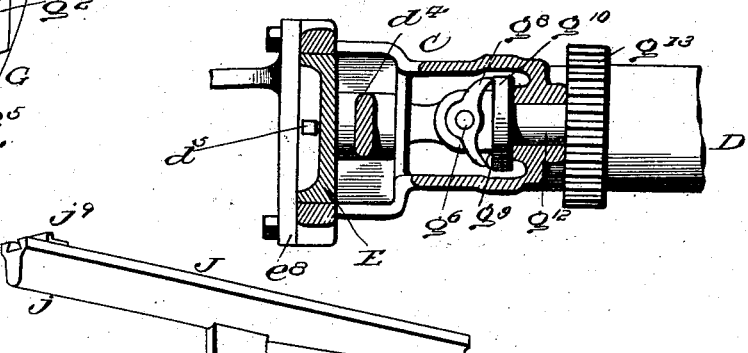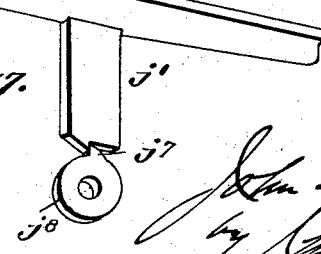

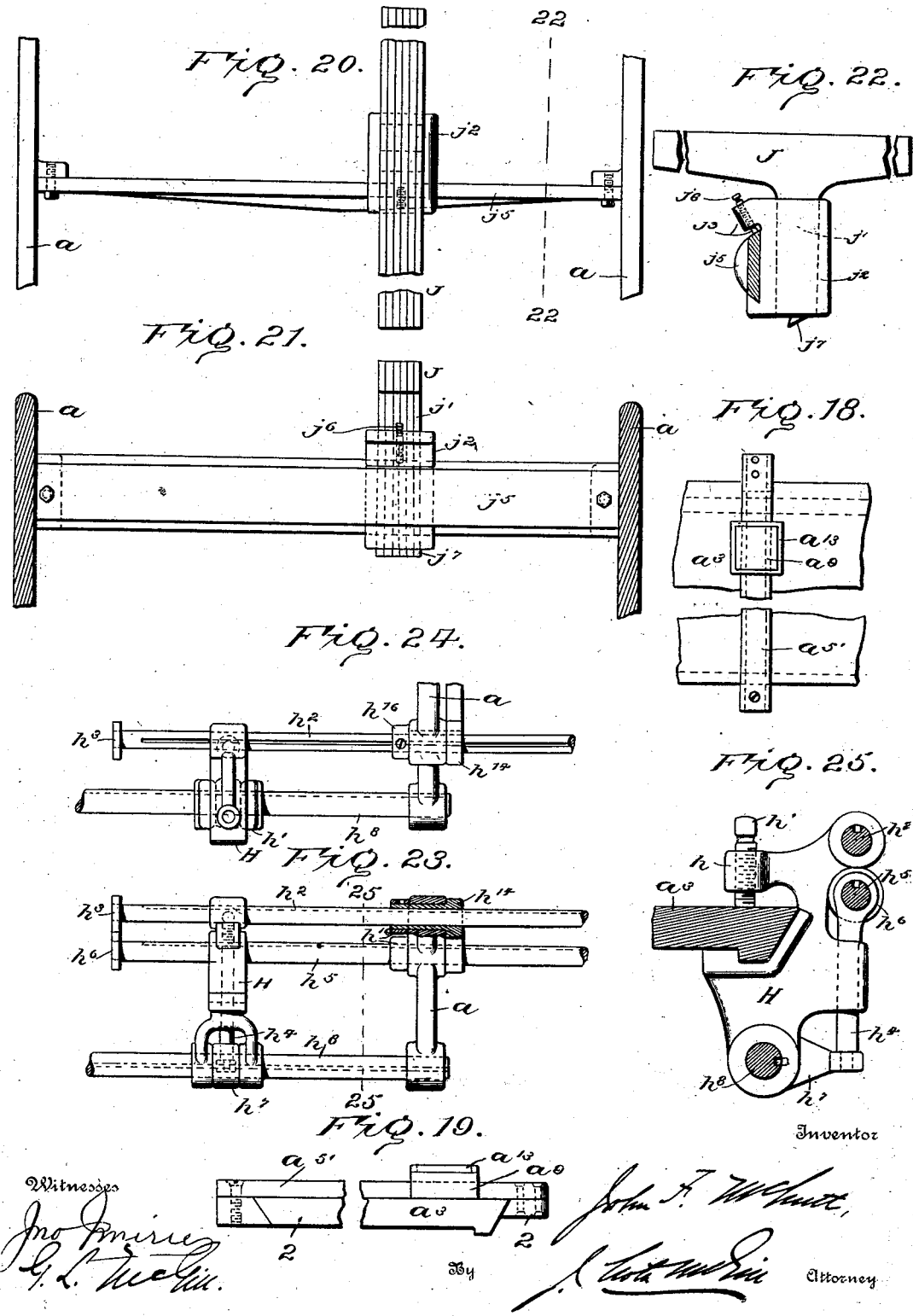

UNITED STATES PATENT OFFICE.

JOHN FRANKLIN McNUTT, OF WARREN, OHIO, ASSIGNOR TO THE HARRIS AUTOMATIC PRESS COMPANY, OF NILES, OHIO, A CORPORATION OF OHIO.

NUMBERING-MACHINE.

SPECIFICATION forming part of Letters Patent No. 694,408, dated March 4, 1902.

Application filed May 25, 1898. Serial No. 681,675. (No model.)

*To all whom it may concern:*

Be it known that I, JOHN FRANKLIN MC-NUTT, of Warren, in the county of Trumbull and State of Ohio, have invented certain new and useful Improvements in Numbering-Machines; and I do hereby declare the following to be a full, clear, and exact description of the invention, such as will enable others skilled in the art to which it appertains to make and use the same.

This invention contemplates certain new and useful improvements in numbering or stamping machines, and has special reference to that class in which a plurality of sets of numbers are stamped or printed simultaneously, such as on sheets of bank-checks and their corresponding stubs.

The primary object of the invention is to provide improved means for feeding the sheets to be printed into and through the machine, to provide for the perfect register of each sheet, to provide improved means for distributing the ink to the inking-rolls, and in general to improve the construction and operation of machines of this character whereby quick and accurate results may be obtained.

The invention will be hereinafter fully set forth, and particularly pointed out in the claims.

In the accompanying drawings, Figure 1 is a view in side elevation. Fig. 2 is a top plan view. Fig. 3 is an enlarged view, partly in section, of one of the numbering-heads, its carrier, frame, and support therefor. Fig. 4 is a front end view thereof. Fig. 5 is a vertical sectional view on line 5 5, Fig. 3. Fig. 6 is an enlarged side view, with parts broken away, showing the feeding and speed mechanism. Fig. 7 is a detail. Fig. 7ª is a view in perspective of parts of the clutch-operating mechanism. Fig. 8 is a sectional view on line 8 8, Fig. 6. Fig. 9 is a front end view of the parts shown in Fig. 6. Fig. 10 is a view of the clutch-pulley. Fig. 11 is a top plan view of a portion of the numbering-head carrier and the shifter of the ink-distributing plate. Fig. 12 is a view in perspective of the latter, showing part of the shifter in engagement therewith. Fig. 13 is a sectional detail on line 13 13, Fig. 2. Fig. 14 is a detail in perspective. Fig. 15 shows the ordinary repeating-disk detached. Figs. 16 and 17 are details. Fig. 18 is a plan view, with parts broken away, of the table and tympan-block. Fig. 19 is an end view thereof. Fig. 20 is a plan view showing the supports for the stops. Fig. 21 is a view of the parts shown in Fig. 20, looking from the front of the machine. Fig. 22 is a vertical sectional view on line 22 22, Fig. 20. Fig. 23 is an enlarged view of the feed-rolls, their shafts, and bearings. Fig. 24 is a plan view of the parts shown in Fig. 23. Fig. 25 is a vertical sectional view on line 25 25, Fig. 23.

Referring to the drawings, A designates a supporting-column having a base $a^\times$, and $a\,a$ a frame which is composed of two corresponding parallel sides $a'$ and a depending portion $a^2$, the latter being secured upon column A. The sides $a'$ support at the front of the machine a transversely-arranged table $a^3$, which is provided in front with an extension $a^4$, secured to arms $a^5$, projecting from the under side of the table. Extending transversely over table $a^3$ are two cross-bars $a^{5'}$, each of dovetail form in cross-section and designed to have secured thereon tympan-blocks $a^6$. These bars $a^{5'}$ are adjustable longitudinally of the table $a^3$, having at their ends tapered pieces 2, which hug oppositely-tapered edges of the table. (See Figs. 18 and 19.) Each block has a dovetailed groove to accommodate its bar $a^{5'}$, to which it is held at any desired point by a screw $a^7$. The upper surface of this block is raised by having a continuous cutaway $a^8$ in its edges, and upon the raised portion is held a pad $a^9$, preferably composed of cardboard packing $a^{10}$ and covering $a^{12}$ of paper, the latter being held by a rectangular clamp-frame $a^{13}$, which fits snug within the cutaway $a^8$. (See Fig. 13.)

B is the main operating-shaft, which has its bearings in upward extensions $b$ of the side of frame $a$. On one end thereof is journaled a differential clutch-pulley $b'$. A handwheel $b^2$ is keyed to said shaft. The driving-belt (not shown) engages any of the steps of pulley $b'$. A cross-rod $b^3$, also having its bearings in extensions $b$, is located beneath the shaft B, and on it are mounted the frames C of the numbering-heads mechanism. Each frame C has a casting $b^4$, formed with a chamber $b^5$, a lower bore $b^6$ to accommodate cross-rod $b^3$, an upper bore $b^7$, a cylindrical portion $b^8$, and an upper casing $b^9$. Through bore $b^7$ extends the shaft B, upon which is keyed a worm $b^{10}$, located in the cylindrical portion $b^8$. This worm meshes with a worm-wheel $b^{12}$ in casing $b^9$. This worm-wheel is keyed on a crank-shaft $b^{13}$. The casting $b^4$ is held firmly on cross-rod $b^3$ by a screw $b^{14}$ and an inner key-block $b^{15}$, fitting in a groove in rod $b^3$. The position of casting $b^4$ is capable of being easily adjusted by means of a screw-rod $b^{16}$, supported at its ends by the sides of frame $a$, said rod being in engagement with an arm $b^{17}$, pivoted at $b^{18}$ to the casting and having a threaded groove $b^{19}$, which is held in contact with said screw-rod by a key $b^{20}$. On the end of this screw-rod is an operating crank-handle $b^{21}$. Each frame C has a horizontal extension D of approximately I form, which is located in chamber $b^5$. The frame C may be adjusted forward or backward by a screw-rod $d$, mounted on extension D and engaging an interiorly-threaded block $d'$, secured to casting $b^4$ within chamber $b^5$. On one end of this screw-rod is a crank-handle $d^2$. By means of the two screw-rods $b^{16}$ and $d$ the numbering-head frames may be adjusted transversely of the machines and also longitudinally thereof.

Within suitable guideways in the front end of each frame C is mounted a vertically-reciprocating carrier E for the numbering-head $e$. This carrier has an opening in which the eccentric-pin $d^3$ of a pitman $d^4$ is held by a set-screw $d^5$, said pitman at its upper end being pivoted to the crank of shaft $b^{13}$. A plate $d^6$ has a rib $d^7$, held in a groove in the body of the carrier by a plate $d^8$ and bolt $d^9$, and from this plate $d^6$ depend hangers $d^{10}$, which support the shaft $e'$ of the numbering-head $e$. By means of the eccentric-pin $d^3$ the the imprint of the numbering-heads may be regulated. Each numbering-head is composed of a series of disks or dials $e^2$ of ordinary form, having numerals on their peripheries. Upon the initially-operated or right-hand disk is a ratchet $e^3$, which is adapted to be engaged by a pawl $e^4$, carried by a lever $e^5$, loosely mounted at its inner end on shaft $e'$. The outer end of this lever is connected by a link $e^6$ to an arm $e^7$, rigid with a front plate $e^8$ of frame C. The pawl $e^4$ is held against the ratchet by a plate-spring $e^9$. By this construction normally the pawl $e^4$ will act upon the first dial and cause the same to be rotated to the extent of one figure at a time. A repeating-disk $e^{10}$ is located adjacent to the first disk of the numbering-head, the purpose of which is, as is well understood in the art, to so control the pawl $e^4$ that it will engage the ratchet on the first disk only once in a certain number of predetermined strokes. For instance, if it should be desired to print the same figure twice, every other notch in the repeating-disk will be shallow enough to prevent the pawl from engaging a tooth on the disk-ratchet. Any number of shallow teeth may be provided in the repeating-disk to allow for the desired number of repetitions. As this feature is well known in the art, further reference thereto is unnecessary.

The inking-rollers F are controlled by a carrier composed of two arms $f$, journaled at their upper ends on a shaft $f'$, mounted in plate $d^6$. The journals of these rollers are held by lower cap-plates $f^2$, secured to the lower ends of arms $f$ by screws $f^3$. Adjusting-bolts $f^4$, extended through the flanges $f^5$ of said arms, bear upon the journals of the inking-rollers and allow of an accurate adjustment of the rollers against the printing-surfaces of the disks. To rearward projections $f^6$ of these arms $f$ are pivotally connected the lower ends of links $f^7$, which depend from frame C. By this connection the vertical reciprocating motion of the carrier E will impart a swinging motion to the carrier of the inking-rollers. When the carrier E is lowered, the inking-rollers will be swung to a rearward position and will be forward beneath the numbering-head when the latter is elevated.

G is the ink-distributer. It consists of a segmental curved plate $g$, on the outer surface of which the ink is applied. This plate is positioned above the line of travel of the inking-rolls, so that the direction of rotation of the latter when in contact with the plate will be the same as when they engage the peripheries of the printing-disks. By this I am enabled to use regular composition rolls without danger of causing abrasion thereof at high speed, and thus also allow the same rolls to be used for a long time. From the inner face of this plate projects a grooved rib $g'$, which accommodates the end of a T-shaped projection $g^2$ of a vertically-disposed sleeve $g^3$, which is preferably formed with an arm $g^4$, projecting rearwardly from said carrier. The plate $g$ is caused to reciprocate horizontally on its bearing by a fork $g^5$, fast on the lower end of a vertical shaft $g^6$, fitted in sleeve $g^3$. The fork $g^5$ sandwiches the lower portion of the rib $g'$, and as said fork is moved to the right and left by the intermittent partial revolution of shaft $g^6$ it will effect the lateral shifting of the plate $g$. On shaft $g^6$ is a collar $g^7$ above sleeve $g^3$, said collar, together with the fork, holding said shaft within its sleeve. Two short lateral fingers $g^8$, projecting from a collar on the upper end of shaft $g^6$, are designed to be engaged by lug $g^9$ on the face of a disk $g^{10}$ when said shaft is in its raised position. This disk is carried by a shaft $g^{12}$, having its bearings in frame C and provided with a gear-wheel $g^{13}$, which meshes with a gear-wheel $g^{14}$, fast on crank-shaft $b^{13}$. This gear-wheel $g^{13}$ is twice the size of the gear-wheel $g^{14}$. Hence one revolution of crank-shaft $b^{13}$ will produce one-half revolution of gear-wheel $g^{13}$. As the carrier E is moved upward the fingers $g^8$ are engaged by the lug $g^9$ and turned first one way and then the other, thereby through the reciprocal movement of shaft $g^6$ effecting the shifting of the ink-distributing plate. Thus it will be seen that in each movement of the numbering-head carrier the ink-distributer is shifted laterally.

The tympan-blocks $a^6$ are so adjusted that they will be directly beneath the numbering-heads. While ordinarily but two numbering-heads are employed at one time, yet a greater or lesser number may be used.

H H designate two brackets, which are adjustably secured to the inner longitudinal edge of table $a^3$, being held by upper and lower jaws $h$ and bolts $h'$. (See Fig. 25.) These frames and the frame $a$ support the shafts $h^2$ of upper feed-rolls $h^3$, the latter being on the inner ends of said shafts. In a vertical opening in each bracket is fitted a slide $h^4$, which supports the shafts $h^5$ of the lower feed-rolls $h^6$. (See Figs. 9 and 16.) These feed-rolls $h^3$ and $h^6$ are practically narrow ring-like enlargements on the inner ends of the shafts $h^2$ and $h^5$. Normally the opposed feed-rolls $h^3$ $h^6$ are out of frictional contact, and the lower one is periodically raised against the upper coacting roll only when a sheet is to be fed forward. The slides $h^4$ are mounted at their lower ends on rearwardly-projected arms $h^7$, keyed on a shaft $h^8$, mounted in the sides of frame $a$ and also in the lower tubular forked ends of frames H. On one end of this shaft $h^8$ is keyed a lever $h^9$, which carries at its outer end a roll $h^{10}$, adapted to ride upon a cam $h^{12}$, mounted on a short shaft $h^{13}$, supported by one side of frame $a$. (See Figs. 6 and 14.) The number of peripheral lugs on this cam corresponds to the number of impressions to be made upon each sheet to be printed. When one of the lugs raises the lever $h^9$, the lower feed-rolls will be brought into contact with the upper feed-rolls, thereby feeding the sheet forward as long as the cam holds the lower feed-rolls elevated. The length of each lug controls the extent to which the sheet is fed forward each time the feed-rolls are brought into play. Hence for convenience I make the cam $h^{12}$ in two corresponding sections 2 and 3, which are so united by bolts 4 that they may be axially adjusted sufficient to make the conjoint length of adjacent lugs control the feeding to suit the character of the work being performed. The shafts $h^2$ $h^5$ are geared together by sleeve-gears $h^{14}$ $h^{15}$, mounted in the sides of frame $a$. The gears proper are outside of the frame, while enlargements $h^{16}$ on the inner ends of the sleeves of said gears abut against the inner side of the frame. These shafts have a spline connection with the sleeve-gears and are capable of being adjusted longitudinally without interfering with the gear connections. The gears $h^{15}$ mesh with intermediate gear-wheels $h^{17}$, mounted on the sides of frame $a$, said wheels $h^{17}$ being driven by gear-wheels $h^{18}$, fast on a shaft $h^{19}$, supported by frame $a$, said shaft being rotated by a gear-wheel $h^{20}$, engaging one of its gear-wheels $h^{18}$ and mounted on a stud $h^{21}$, which also supports a sprocket-wheel $h^{22}$, the belt $h^{23}$ of which is in engagement with a wheel $h^{24}$, fast on one end of the main operating-shaft B.

On shaft $h^{19}$ are mounted pulleys $i$ $i$, over which pass four carrying-tapes I, which are extended rearwardly on a horizontal line and are then passed over a drum $i'$, journaled in the rear end of frame $a$. From this drum the tapes are carried forward and downward beneath a small drum $i^2$, which serves to keep the tapes in proper tension. This drum $i^2$ is journaled in the outer ends of arms $i^3$, which are loosely pivoted at $i^4$ to the sides of frame $a$. These tapes are constantly operated by the rotation of shaft $h^{19}$, which derives its power from shaft B. They are designed to convey the sheets after the printing is completed. As the tapes approach the drum $i'$ they assume a slightly-raised position, so that in carrying a sheet they will coact with cords $i^5$, carried by three rolls $i^6$, journaled in the sides of frame $a$, said cords being passed against the drum $i'$ in passing from the upper to the lower rolls. The journals of the rearmost roll $i^6$ are mounted in bearings $i^7$, adjustable on end extensions of frame $a$, whereby the tension of cords $i^5$ may be regulated. The printed sheets are delivered by the tapes and cords onto a receiving-table $i^8$, which is pivotally mounted at $i^9$ on the upper end of a vertically-adjustable standard $i^{10}$, held in a bracket $i^{12}$, projecting from base $a^\times$, by a set-screw $i^{13}$. This table is usually set at an incline, so that the printed sheets will fall against a stop-bar $i^{14}$, extended transversely across its upper surface near its lower edge.

J J designate two series of stops for positioning the sheets preparatory to each impression. These stops are located between each pair of tapes I, and each series comprises horizontally-disposed bars $j$, having depending vertical portions $j'$, which are guided by and contained within an inclosing bracket $j^2$, which latter is formed with a dovetail groove $j^3$, accommodating a cross-bar $j^5$, extending from side to side of the frame. (See Figs. 20, 21, and 22.) A set-screw $j^6$ holds the bracket in position on bar $j^5$, allowing of its adjustment longitudinally of said bar. The lower end of the vertical portion of each stop-bar is formed with an inclined shoulder $j^7$, with which is designed to engage a cam $j^8$, fast on a shaft K, extending across the frame beneath the bracket. The purpose of the several cams $j^8$ is to effect the raising of the corresponding stop-bars. On the upper horizontal edges of the latter are secured small stops $j^9$, which fit in dovetail grooves in said edges. These stop-bars are so arranged that they are operated in pairs—that is, the respective cams of one bar of each series are similarly positioned on shaft K, and the stops $j^9$ of both bars are arranged in line with each other. The distance between the stops of the several pairs of bars represent the spaces between the printing-points on the sheets, those of the pair first operated, which are at or near the extreme forward ends thereof, constitute the guides for placing the sheets for the first impression. When the machine is put in motion, the shaft K revolves, lowers the first-operated pair of stop-bars and raises the second pair, the stops upon which have been placed, say, about three inches further back than those of the first-operated pair, and thus they form the guide for positioning the sheet for the second impression of the numbering-heads and likewise are the stops of the remaining pairs of bars arranged for the succeeding impressions. It will be understood that as the first-operated pair of stopbars is lowered the feed-rolls will be brought into contact by the cam $h^{12}$ immediately after the first impressions have been made, and then the sheets will be advanced to the stops on the next pair of bars, which are raised in time to insure engagement of the sheet with said stops. Likewise when the second impressions have been made the second pair of bars will be lowered, the feed-rolls brought into contact, so as to feed the sheet, and the third pair of stop-bars will be elevated, and so on until the last set of impressions is made, when the sheet will be carried by tapes I and cords $j^5$ to the table $i^3$. It will be noticed that by the slight rise in the tapes I at the rear ends of the stop-bars contact of the sheet with the tapes occurs only after the last set of impressions has been made.

By the term "set of impressions" I refer to the impression of two numbering-heads, such as in the numbering of checks and their stubs.

On one end of shaft K is a series of differential gear-wheels $k$, of gradually and correspondingly decreased diameters. With any one of these gear-wheels engages an intermediate gear-wheel $k'$, journaled on the outer end of an arm $k^2$, located outside of the frame $a$. This arm is formed with and extends at a right angle from a sleeve $k^3$, which is fitted on a shaft L, extended transversely through the frame. This end of said shaft projects outward from the frame on a line with the smallest gear-wheel of the series $k$, while on the other end of said shaft is a sprocket-wheel $k^4$, which is driven by a chain $k^5$, passed over a sprocket-wheel $k^6$ on shaft B. With gear-wheel $k'$ intermeshes a small gear-pinion $k^7$, splined on shaft L and held in position by a flanged plate $k^8$, extending from the end of sleeve $k^3$. This sleeve being elongated can be moved longitudinally on shaft L when it is desired to change the number of revolutions the machine will make. This is determined by the ratio of the gear-pinion $k^7$ with any one of the gear-wheels $k$. With the intermediate gear-wheel $k'$ in engagement with the gear-wheel of maximum diameter to one revolution of shaft K the motion transmitted through gear-pinion $k^7$ will be six to one—that is, the machine will make six sets of impressions to one revolution of said shaft. If the intermediate gear-wheel $k'$ is in engagement with any of the other gear-wheels of the series, the ratio will be five, four, three, two, and one, respectively. Hence it will be seen that upon the sheets may be printed any number of sets of impressions from one to six, inclusive. In changing the gear ratios the number of cams upon the shaft K, operating the stop-bars, should be correspondingly changed. For instance, if only four different impressions are to be made only four stop-bars should be operated by the same number of cams placed on shaft K. Likewise the cam $h^{12}$, which controls the feed-rolls, should have but four lugs or peripheral projections. On shaft K is a sprocket-wheel $l$, which imparts motion to shaft $h^{13}$, on which cam $h^{12}$ is keyed, through the agency of a chain $l'$ engaging a sprocket-wheel $l^2$, fast on the said shaft $h^{13}$.

M is a foot-treadle fulcrumed at $m$ to a stud of base $a^\times$ and connected by a rod $m'$ to an arm $m^2$, fitted on a shaft $m^3$, having its bearings in frame $a$ and from which in turn extends a laterally-projecting arm $m^4$, the outer end of which is connected by a rod $m^5$ to the clutch-operating mechanism (not shown) of pulley $b'$. From this arm $m^4$ extends a short arm $m^6$, having a flanged end $m^7$, which is in line with the outer end of arm $m^4$. When the treadle is depressed, an arm $m^8$, pivoted at $m^9$ to frame $a$, swings rearward under action of a weighted projection $m^{10}$, and its lower end being immediately above the end of the short arm $m^6$ holds the latter as against rising. In this way the treadle is held depressed during the operation of the machine. As the shaft K completes its revolution an arm $m^{12}$, fast thereon, strikes a shoulder $m^{13}$ on arm $m^8$ and moving the latter out of engagement with the short arm $m^6$ permits the treadle to lower, and thus bring the machine to a stop.

The operation is a follows: The numbering-heads being first properly arranged, the operator places the sheet to receive the first impression over the tympan-pads, the forward edge of the sheet abutting against the stops of the first-operated pair of stop-bars, which are brought into position by turning hand-wheel $b^2$ of shaft B. The operator then sets the machine in motion by pressing his foot on treadle M, which allows shaft B to rotate. The revolution of this shaft will, through crank-shaft $b^{13}$, cause the reciprocation of the carriers of the numbering-heads. As the latter move downward the inking-rollers are thrown out of the way and into contact with the laterally-shiftable ink-distributing plate. When the first impression has been made, the feed-rolls are brought into play and grasping the sheet between them feed the same forward against the stops of the second operated pair of stop-bars, which are raised by the revolution of shaft K. This is continued until the last impression or set of impressions has been made, by which time the forward edge of the sheet will be caught between tapes I and cords i⁵, and being carried over drum i' is deposited onto the receiving-table face down.

From what has been said it will be seen that as each impression is completed the sheet will be mechanically fed forward and will be guided and held at the proper point ready to receive a second or further impression by contact with the stops, the raising of which is controlled by the number of impressions to be made on each sheet.

The advantages of my invention being apparent to those skilled in the art need not be here recited.

I claim as my invention—

1. In a numbering-machine, a carrier for the numbering-head, a frame in which said carrier is mounted, means for reciprocating said carrier vertically, a support for said frame, an adjusting-rod for effecting the longitudinal adjustment of said frame in relation to its said support, and a second adjusting-rod for adjusting said support transversely of the machine, substantially as set forth.

2. The combination with the numbering-head and the carrier therefor, of pivoted arms depending from said carrier having lower flanged ends, plates adjustably held to said ends, ink-rollers having their journals resting on said plates, adjusting-screws in said flanged ends bearing on said journals, an ink-distributing plate, and means for moving said arms and rollers rearward when said carrier is lowered, substantially as set forth.

3. The combination with the numbering-head, the ink-rollers, and the swinging carrier therefor, of an ink-distributing plate mounted in rear of said head, a rod engaging said plate, and means for partly rotating said rod alternately in opposite directions for shifting said plate laterally on its support, as set forth.

4. The combination with the numbering-head, the ink-rollers, and the swinging carrier therefor, of an ink-distributing plate having a groove, a support for said plate fitting in said groove, a rod engaging said plate, and means for partly rotating said rod alternately in opposite directions, as set forth.

5. The combination with the numbering-head, the carrier therefor, the ink-rollers and their swinging carrier mounted on said former carrier, of a shiftable ink-plate supported by said former carrier, an upright rod movable with the latter and having a fork on its lower end for engaging and shifting said plate, and means for partly rotating said rod alternately in opposite directions, as set forth.

6. The combination with the numbering-head, the carrier therefor, the ink-rollers and their swinging carrier mounted on said former carrier, of a shiftable ink-plate supported by said former carrier, an upright rod movable with the latter and having a fork on its lower end for engaging and shifting said plate, fingers projecting laterally from the upper end of said rod, and a rotary disk having a lug designed to engage said fingers and partly rotate said rod alternately in opposite directions, substantially as set forth.

7. The combination with the numbering-head, the carrier therefor, the ink-rollers and their swinging carrier mounted on said former carrier, of a shiftable ink-plate having a rib formed with a groove, a vertically-disposed sleeve supported by said former carrier and having a projection extended into said groove, an upright rod extended through said sleeve and having a fork on its lower end engaging said rib, a collar on said rod above said sleeve, fingers projecting laterally from said rod, and a rotary disk having a lug designed to engage said fingers and partly rotate said rod alternately in opposite directions, substantially as set forth.

8. The combination with the operating-shaft, the crank-shaft driven thereby and having a gear-wheel thereon, of a numbering-head, the carrier therefor, the frame for said carrier, a short shaft mounted in said frame and having a gear-wheel meshing with said former gear-wheel, a disk on said short shaft having a lug on its front face, ink-rollers, a carrier therefor, an ink-plate, an upright rod having a fork engaging said plate and provided at its upper end with laterally-projecting fingers designed to be engaged by the lug on said disk, as set forth.

9. A numbering-machine having a series of feed-rolls normally out of engagement, and means for intermittently throwing said rolls into frictional contact, in combination with a series of stops means for periodically positioning said stops in and removing them from the feed-line and means for timing the operation of said feed-rolls relatively to the operation of the stops, as set forth.

10. A numbering-machine having a series of coacting feed-rolls normally out of engagement, gearing between said feed-rolls and means connected to one feed-roll of each series for intermittently throwing said rolls into frictional contact, in combination with a series of stops means for periodically positioning said stops in and removing them from the feed-line and means for timing the operation of said feed-rolls relatively to the operation of the stops, as set forth.

11. A numbering-machine having a frame, a series of coacting feed-rolls normally out of engagement, longitudinally-adjustable shafts for said feed-rolls, intermeshing gear-wheels for said shafts, held in fixed relation to said frame, and means for acting on the shaft of one feed-roll of each series, for intermittently throwing the rolls into frictional contact, as set forth.

12. A numbering-machine having a frame, a series of coacting feed-rolls normally out of engagement, separate shafts for said feed-rolls each of said shafts being longitudinally adjustable, gearing between the shafts of each series, held in fixed relation to said frame, a movable bearing for one of the shafts of each series of feed-rolls, and means for intermittently moving such bearings, as set forth.

13. A numbering-machine having coacting feed-rolls, intermeshing gear-wheels for rotating said rolls, a shaft for throwing said feed-rolls into and out of engagement, an arm on said shaft, and means for engaging said arm for holding the rolls in frictional contact, such means being capable of being adjusted to regulate the extent of such contact, as set forth.

14. A numbering-machine having coacting feed-rolls, shafts therefor, a movable bearing for one of said shafts, a shaft to which said bearing is connected, an arm on said latter shaft, a cam having peripheral lugs with which said arm engages, and means for increasing or lessening the lengths of such lugs, as set forth.

15. A numbering-machine having upper and lower shafts, feed-rolls on said shafts, an adjustable bracket supporting one of such shafts and having a vertical opening, a bearing for the other shaft having a depending portion fitted in said vertical opening, a shaft having an arm to which said depending portion is secured, an arm on the outer end of said latter shaft, and a cam engaging said latter arm, substantially as set forth.

16. In a numbering-machine, the combination with the main frame, of shafts having coacting feed-rolls on their inner ends, sleeves mounted in the sides of said frame having at one end intermeshing gear-wheels splined on said shafts, adjustable brackets having openings for one of said shafts, movable bearings for the other one of said shafts, a shaft having arms to which said bearings are secured, an arm on one end of said latter shaft and a cam engaging said latter arm, substantially as set forth.

17. In a numbering-machine, the combination with the main frame having a table extended across one end, of brackets adjustably secured to said table and having openings in their lower ends and also formed with vertical openings, upper and lower shafts having feed-rolls, said upper shafts being supported by said frame and brackets, movable bearings for said lower shafts, fitted in said vertical openings, a shaft mounted in said frame and extended through the lower openings in said bearings, arms thereon supporting said movable bearings, an arm on one end of said shaft, and a cam having peripheral lugs with which said latter arm engages, substantially as set forth.

18. The combination with the coacting feed-rolls, of means for throwing the same into frictional contact, such means comprising an arm and a cam with which such arm engages, such cam being formed in sections, axially adjustable, and having peripheral lugs, as set forth.

19. The combination with the feed-rolls, and the movable bearing for one of the rolls, of a shaft to which said bearing is connected, an arm on the end of said shaft, and a cam formed in two sections, axially adjustable and having peripheral lugs, as and for the purpose set forth.

20. In a numbering-machine, a plurality of stops arranged at different points between the receiving and discharging ends of the machine, such stops being normally out of the line of travel, in combination with means for intermittently feeding the stock, such stock being fed between the removal of one stop from, and the placing of another stop in, the line of travel, as set forth.

21. In a numbering-machine, a plurality of stops arranged at different points between the receiving and discharging end of the machine, such stops being normally on a uniform plane out of the line of travel of the stock, means for successively raising each of said stops into the line of travel as a precedingly-raised stop is removed from such line of travel, in combination with means for intermittently feeding the stock, such stock being fed between the withdrawal of one stop from, and the raising of another stop into, the line of travel of the stock.

22. In a numbering-machine, a series of bars, a series of stops adjustably secured on said bars at different distances from the receiving end of the machine, such stops being normally out of the line of travel of the stock, and means for engaging each of said bars for periodically and successively throwing such stops across such line of travel, as set forth.

23. In a numbering-machine, a series of bars, a series of stops adjustably secured on the upper edges of said bars, such stops being at different distances from the receiving end of the machine, each of said bars having a depending portion, a bracket for holding said bars, and a series of cams, one for each bar, for periodically and successively raising the latter, as set forth.

24. In a numbering-machine, a series of stop-bars having upper horizontal portions formed with longitudinal grooves and central depending portions, stops adjustably held in said grooves, a bracket in which said depending portions are held, a cross-bar supporting said bracket, and a rotary shaft having a series of cams corresponding to said stop-bars for periodically raising the latter, substantially as set forth.

25. A printing-machine having reciprocating printing mechanism, a series of spaced-apart stops with each of which the stock is designed to successively engage, means for withdrawing each stop after each imprint, means for periodically feeding the stock over the printing-field between the imprints, and means for operating such feeding means between the removal of one stop from, and the placing of another stop in, the line of travel.

26. A numbering-machine having a series of stops normally out of the line of travel of the stock, a shaft having cams corresponding to said stops for successively placing the same across such line of travel, feed-rolls normally out of contact, means for periodically throwing said feed-rolls into frictional contact, and means for operating said cam-carrying shaft, substantially as set forth.

27. A numbering-machine having a series of stops normally out of the line of travel of the stock, a shaft having cams corresponding to said stops for successively placing the same across such line of travel, feed-rolls normally out of contact, a shaft for throwing said feed-rolls into frictional contact, an arm on said shaft, a cam driven by said first-mentioned shaft and having peripheral lugs corresponding to the number of said stops, said arm being designed to be engaged by said lugs, substantially as set forth.

28. In a numbering-machine, a series of independent stops, arranged at different distances from the receiving end of the machine, a shaft having a series of cams for successively operating said stops, differential gearing on said shaft corresponding to said stops, and operating mechanism engaging said differential gearing, as and for the purpose set forth.

29. In a numbering-machine, a series of independent stops, arranged at different distances from the receiving end of the machine, a shaft having a series of cams for successively operating said stops, differential gearing on said shaft corresponding to said stops, a rotating shaft having a gear-pinion and an arm concentric with said shaft carrying an intermediate gear-wheel meshing with said pinion and said differential gearing, as set forth.

30. In a numbering-machine, a series of independent stops, a shaft having a series of cams for operating said stops, differential gearing on said shaft corresponding to said stops, a rotating shaft having a gear-pinion capable of being adjusted longitudinally thereon, an arm having a sleeve adjustable on said latter shaft and an intermediate gear-wheel intermeshing with said pinion and said differential gearing, as set forth.

31. In a numbering-machine, a series of independent stops, a shaft having a series of cams for operating said stops, differential gearing on said shaft corresponding to said stops, a rotating shaft having a gear-pinion capable of being adjusted longitudinally thereon, an arm having a sleeve adjustable on said latter shaft, a flanged plate projecting from said sleeve holding said gear-pinion, means for holding said arms, and an intermediate gear-wheel mounted on the outer end of said arm meshing with said pinion and differential gearing, substantially as set forth.

32. In a numbering-machine having a table across its front end, a bar, or bars, extended transversely over said table having tapered edges, tympan-blocks having grooves accommodating said bars, screws for holding said blocks, coverings for each of said blocks, and frames surrounding said blocks for holding said covering, substantially as set forth.

33. In a numbering-machine having a main frame, and a rotary shaft provided with pulleys, tapes passed over said pulleys and extended horizontally within said frame along the line of travel of a sheet to be printed, a drum supported by said frame at the rear end thereof over which said tapes are passed, a lower drum bearing on said tapes, pivoted arms therefor, a series of rollers also supported by said frame, two of said rollers being above and below said first-mentioned drum, respectively, a third roller being on a line with said drum and having adjustable supports for its bearings, and a lower receiving-table, as set forth.

34. A numbering-machine having its main operating-shaft provided with a clutch, a foot-treadle having a rod for releasing said clutch, and provided with a rocking member having a projecting arm, a pivoted arm for engaging said former arm, and means for releasing said arms, as set forth.

35. A numbering-machine having its main operating-shaft provided with a clutch, a foot-treadle, a rocking member to which said treadle is connected, a rod connected to said member, a pivoted arm having an upper weighted portion and designed to engage said former arm at its lower end, and a rotary shaft having an arm thereon designed to engage said pivoted arm and release the same from engagement with said former arm, substantially as set forth.

In testimony whereof I have signed this specification in the presence of two subscribing witnesses.

JOHN FRANKLIN McNUTT.

Witnesses:
W. C. KEELEY,
IDA H. TODD.